Nov. 14, 1950 M. J. HUNTER 2,530,356
HIGH VACUUMS
Filed June 13, 1945
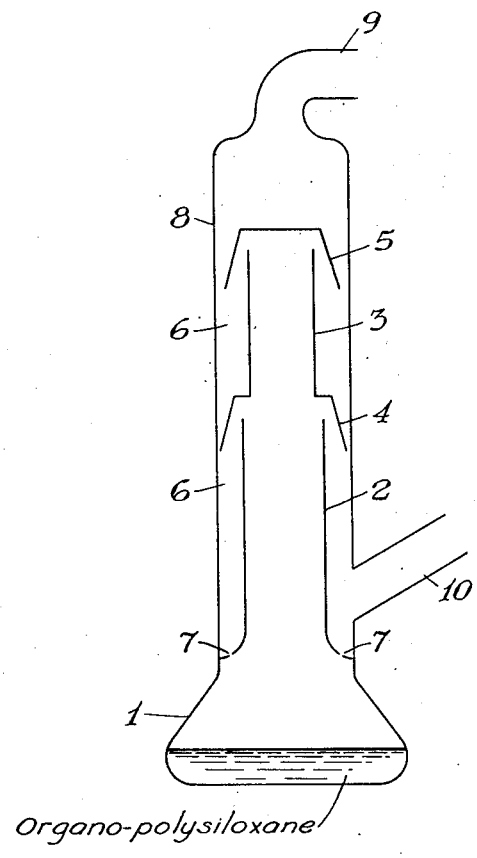
INVENTOR.
Melvin J. Hunter
BY
Griswold & Burdick
ATTORNEYS Patented Nov. 14, 1950

2,530,356

UNITED STATES PATENT OFFICE 2,530,356

HIGH VACUUMS

Melvin J. Hunter, Midland, Mich., assignor to The Dow Chemical Company, Midland, Mich., a corporation of Delaware Application June 13, 1945, Serial No. 599,315

12 Claims. (Cl. 230—101)

This invention relates to an improved method for the production of high vacua, and more particularly to improved fluids for use in high vacuum pumps.

The pumping fluids provided by the invention are organo-siloxanes which are liquid at temperatures below those at which the pump is operated and which boils at temperatures within the range of from 250° to 500° C. at atmospheric pressure. The organic portions of the molecule are hydrocarbon radicals that are attached directly to the atoms of silicon, and each valence of silicon not taken up by a hydrocarbon radical is satisfied by a linkage through oxygen to another silicon atom. For convenience, all such organo-siloxanes are hereinafter referred to as being "liquid," since they are liquid at temperatures approaching the operating temperature, e. g. at 200° C. and above, even though they may in some instances be solid at room temperature. Organo-siloxanes which are liquid at room temperature are preferred.

The organo-siloxanes may contain from 1.6 to 3.0, and preferably contain from 2.0 to 3.0, monovalent hydrocarbon radicals per atom of silicon and usually contain from 2 to 15 silicon atoms in the molecule. They may be composed of straight chain compounds, or cyclic compounds, or both. The hydrocarbon radicals of the liquid organo-siloxanes may be lower alkyl radicals such as methyl, ethyl, or propyl radicals, or they may be aryl, aralkyl or alicyclic radicals such as phenyl, tolyl, benzyl, or cyclohexyl radicals, etc. Liquid organo-siloxanes which contain lower alkyl radicals, particularly methyl radicals, and which may advantageously also contain phenyl radicals in the molecule constitute a preferred embodiment of the invention. The liquid organo-siloxanes containing both methyl and phenyl radicals in the molecule are advantageously materials having compositions within the limits expressed by the formula

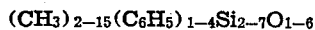

wherein the hydrocarbon radicals are attached directly to silicon atoms and preferably are ones having compositions within the limits of the somewhat narrower formula

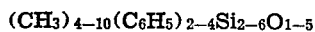

I have discovered that the above-mentioned liquid organo-siloxanes possess properties which make them valuable as fluid media in diffusion or condensation pumps. They have very low vapor pressures, which enable the production of high vacua. They are practically inert to the action of moisture and oxygen, even at elevated temperatures. My new pumping fluids are exceptionally resistant to thermal decomposition such as frequently takes place during normal operation, or as a result of accidental hot exposure to air at atmospheric pressure, when using organic esters as the pumping fluids. Moreover, employment of the new pumping fluids permits the operator to make pressure adjustments by admitting air at a temperature of 150° to 200° C. or even higher, and thus eliminates the usual loss of time which results from the necessity of cooling the system before making such adjustments. Operation of a pump charged with such fluid may be discontinued when desired and air may be admitted abruptly while the fluid is at the operating temperature without injury to the fluid or the pump. It can thus be seen that, because of their great stability, the polymeric organo-siloxanes of this invention represent a decided advance over organic esters, e. g. alkyl phthalates or sebacates, which are ordinarily employed as pumping fluids. The new fluids do not require any special equipment or operating conditions. They are suitable for use in any condensation or diffusion pump designed for the production of high vacua by the entrainment of gases in a stream of vapors of a pumping fluid.

The accompanying drawing is a diagrammatic sketch of a condensation pump containing a liquid organo-siloxane as the pumping fluid. As is known, such pump comprises a boiler 1, one or more vapor jets such as those designated by the numerals 2 and 3, umbrellas 4 and 5 over the respective jets 2 and 3 for deflecting vapors downward into a condensation zone 6. The openings, e. g. ports or orifices, 7 near the base of said zone permit return of condensed liquid to the boiler 1. Condensation may be facilitated by cooling the outer wall 8 in usual ways, e. g. with air or water. The numeral 9 designates a gas line which may be connected to a system to be evacuated. Numeral 10 designates another gas line which is connected to a fore-pump, not shown, which is capable of producing a moderate vacuum, e. g. in the order of from 0.1 to 1 millimeter absolute pressure. Except for the organo-siloxane present as the pumping fluid, the apparatus and its arrangement are conventional.

The new pumping fluids of this invention may be prepared from hydrolyzable organo-silanes by methods which are well known to the art. Organo-silanes which are suitable as starting materials are those which contain one or two readily hydrolyzable groups, e. g. a halogen or an alkoxy group, and two or three hydrocarbon radicals attached to silicon through a carbon atom. Examples of hydrolyzable organo-silanes which may be employed in preparing the organo-siloxanes are dichlorodimethylsilane, $(CH_3)_2SiCl_2$; ethoxytrimethylsilane, $(CH_3)_3SiOC_2H_5$; dibromodiethylsilane, $(C_2H_5)_2SiBr_2$; dichloromethylphenylsilane, $CH_3(C_6H_5)SiCl_2$; bromotriethylsilane, $(C_2H_5)_3SiBr$; diethoxydiphenylsilane, $(C_6H_5)_2Si(OC_2H_5)_2$; benzyldichloroethylsilane, $C_2H_5(C_6H_5CH_2)SiCl_2$; ethoxymethyldiphenylsilane, $CH_3(C_6H_5)_2SiOC_2H_5$; etc. In one method of making the organo-siloxanes, water is slowly added to a hydrolyzable organo-silane in amount exceeding that required to effect complete removal of the hydrolyzable groups. The process of hydrolysis may be carried out in the presence of organic diluents if desired. Catalysts, e. g. small amounts of mineral acids or alkalies, may also be present. When the addition of water is complete, the reaction mixture may be heated with stirring to a temperature at which refluxing takes place, and maintained at such temperature for sufficient time to ensure complete removal of hydrolyzable radicals from the starting material. As is known, condensation of the hydrolysis products takes place concurrently, and a water-immiscible fluid is produced which may be separated and purified, e. g. by fractional distillation. The fluids which we have found to be particularly advantageous for use as pumping fluids are isolated during such fractional distillation as materials distilling at temperatures within the range of from 250° to 500° C. at atmospheric pressure.

The invention may be described in greater detail with the aid of the following examples which are presented as illustrative only:

*Example 1*

6000 grams of dichloromethylphenylsilane, $CH_3C_6H_5SiCl_2$ of 85 per cent purity, containing a minor amount of trichlorophenylsilane, $C_6H_5SiCl_3$, were mixed with 1334 grams of diethoxydimethylsilane, $(CH_3)_2Si(OC_2H_5)_2$ and 1073 grams of ethoxytrimethylsilane, $(CH_3)_3SiOC_2H_5$. To this mixture approximately 9650 grams of water were added with stirring. The reaction mixture was heated with stirring to a reflux temperature for 2 hours to ensure complete removal of hydrolyzable groups. The mixture was then permitted to settle into layers which were separated. As the water-immiscible layer, an almost colorless oil was obtained. It was washed several times with water to remove last traces of acid and distilled to a pot temperature of 250° to 270° C./1-2 mm. From 30 to 35 per cent of the oil was recovered as distillate. It was subsequently redistilled and the products, (A) distilling at 160° C./0.2 mm., and (B), at 190° C./0.2 mm., respectively, were isolated. These two fractions constituted approximately 20 to 25 per cent of the total amount of the original oil.

The product (A) distilling at 160° C./0.2 mm. was found to have a composition corresponding to that represented by the formula:

$$(CH_3)_{10}(C_6H_5)_2Si_5O_4$$

It is a water-white liquid, having a viscosity of 27.0 centistokes at 25° C., and a refractive index of 1.5062 at 20° C., a boiling point range of from 400° to 410° C., and a pour point of approximately —40° C. Apparently it consists of a mixture of polymers having the average composition just given. Heating of the material under reflux at 400° C. and at atmospheric pressure for 25 hours resulted in only minor changes in properties. This material was employed as the pumping fluid in all-glass and also in all-metal diffusion pumps which had been designed for use with organic esters. After three months of continuous operation there was no evidence of change in the physical properties of the organo-siloxane fluid. In both tests, it was noted that no conditioning, i. e. for a removal of lower-boiling decomposition products, was necessary after a cycle of operation. The degree of vacuum obtained, without baking out of the system, was $8 \times 10^{-7}$ mm. pressure as measured on an ionization gauge. After exposure of the pumping fluid to air at an operating temperature of approximately 185° C., it required less than twenty minutes to return to the degree of vacuum just mentioned.

The aforementioned fraction (B) of copolymers which distilled from the mixture of low polymers at 190° C./0.2 mm. had an analysis corresponding to an average molecular composition of $(CH_3)_7(C_6H_5)_3Si_5O_5$. It is a water-white liquid having a viscosity of 60 centistokes at 25° C., a refractive index of 1.5171 at 20° C., a boiling-point range of from 430° to 440° C. at atmospheric pressure, and a pour point of approximately —35° C. It was employed continuously over a period of more than 1000 hours as a pumping fluid in a glass diffusion pump. At the end of this period of service, no change in its physical properties could be detected. The degree of vacuum obtainable, with no baking-out of the system, was $2 \times 10^{-7}$ mm. of pressure as measured with a standard ionization gauge.

*Example 2*

A mixture of 26.6 pounds of dichloromethylphenylsilane, $CH_3C_6H_5SiCl_2$, 7.85 pounds of diethoxydimethylsilane, $(CH_3)_2Si(OC_2H_5)_2$, and 6.2 pounds of ethoxytrimethylsilane, $(CH_3)_3SiOC_2H_5$, was diluted with two gallons of toluene, and hydrolyzed by the addition of two gallons of water over a period of 4 hours. The product separated into two layers. The water immiscible layer was washed several times with water and was then heated to a pot temperature of 150° C. to remove water, solvent, etc. The temperature was increased to 320° C./2-3 mm., and 16 pounds of distillate were collected. The residual fluid amounted to 4.7 pounds. Fractional distillation of the volatile portion yielded the following products, which are satisfactory pumping fluids:

| Fraction | Yield, Per Cent | Boiling Point, °C | Viscosity, Centistokes | Ref. Index, $n_D^{20}$ |
|---|---|---|---|---|
| A | 20.1 | 120/0.1 mm. (320-330/760 mm.) | 10.8 | 1.4805 |
| B | 37.5 | 155/0.05 mm. (380-400/760 mm.) | 31 | 1.5076 |
| C | 35.5 | 195/0.08 mm. (420-440/760 mm.) | 59.5 | 1.5180 |

*Example 3*

A mixture of 54.3 pounds of dichloromethylphenylsilane, $CH_3C_6H_5SiCl_2$, (0.28 mole), 20.0 pounds of diethoxydimethylsilane, $$(CH_3)_2Si(OC_2H_5)_2$$

(0.13 mole), and 15.5 pounds of ethoxytrimethylsilane $(CH_3)_3SiOC_2H_5$ (0.13 mole) was diluted with 4 gallons of toluene and hydrolyzed by the addition of 4 gallons of water over a period of 4 hours. The reaction product separated into two layers, which were separated. The water immiscible layer was washed several times with water and then distilled to a pot temperature of 320° C./2–3 mm. There were obtained 36.4 pounds of distillate and 9.8 pounds of residual higher-boiling fluid. The volatile portion was subsequently fractionally distilled. The following fractions, which are useful as the pumping fluids of this invention, were obtained:

| Fraction | Yield, Per Cent | Boiling Point, °C | Viscosity, Centistokes | Ref. Index, $n_D^{20}$ |
|---|---|---|---|---|
| A | 21.0 | 115–120/0.1 mm | 12.3 | 1.4819 |
| B | 43.2 | 150–160/0.1 mm | 23.8 | 1.5072 |
| C | 28.7 | above 190/0.1 mm | 48.0 | 1.5100 |

*Example 4*

Dimethyltetraphenyldisiloxane

$(CH_3)_2(C_6H_5)_4Si_2O$ is a low molecular weight organo-silicone polymer which is crystalline at ordinary temperatures. It may conveniently be prepared by heating ethoxy-methyldiphenylsilane, $CH_3(C_6H_5)_2SiOC_2H_5$, together with water. Dimethyltetraphenyldisiloxane melts at approximately 50° C. and boils at 170° C./0.2–0.3 mm. It is stable to air at temperatures at least as high as 250° C. This compound has been employed in diffusion pumps with very satisfactory results. It should be pointed out, however, that because dimethyltetraphenyldisiloxane contracts on freezing and expands on melting, it requires cautious handling when employed in glass pumps, in order to avoid breakage of the apparatus.

I claim:

1. In a method of producing high vacua by means of a condensation pump, the improvement which comprises entraining gas, from the system to be evacuated, in a stream of vapors of an actuating fluid consisting essentially of an organo-polysiloxane in which the organic portion of the molecule is composed of phenyl and lower alkyl radicals and all valences of the silicon atoms are satisfied by siloxane linkages and by carbon atoms of organic radicals, and which boils at a temperature within the range of from 250° C. to 500° C. at atmospheric pressure and is substantially free of material boiling below said range.

2. In a method of producing high vacua by means of a condensation pump, the improvement which comprises entraining gas, from the system to be evacuated, in a stream of vapors of an actuating fluid consisting essentially of an organo-polysiloxane which is liquid at temperatures below 350° C. and which boils at a temperature within the range of from 350° to 500° C. at atmospheric pressure and is substantially free of material boiling below said range and in which the organic portion of the molecule is composed of phenyl and methyl radicals and all valences of the silicon atoms are satisfied by siloxane linkages and by carbon atoms of organic radicals.

3. Means for evacuating a closed system which comprises a condensation pump containing, as an evacuating medium, an organo-polysiloxane in which the organic portions of the molecule are composed of phenyl and lower alkyl radicals and all valences of the silicon atoms are satisfied by siloxane linkages and by carbon atoms of organic radicals, and which is liquid at temperatures below 250° C., and which boils at a temperature within the range of from 250° to 500° C. at atmospheric pressure and is substantially free of material boiling below said range.

4. Means for evacuating a closed system which comprises a condensation pump containing, as an evacuating medium, an organo-polysiloxane in which the organic portion of the molecule is composed of phenyl and methyl radicals and all valences of the silicon atoms are satisfied by siloxane linkages and by carbon atoms of organic radicals and which organo-polysiloxane is liquid at temperatures below 350° C., and boils at a temperature within the range of from 350° to 500° C. at atmospheric pressure and is substantially free of material boiling below said range.

5. Means for evacuating a closed system which comprises a condensation pump containing a liquid organo-polysiloxane composed of silicon, oxygen, phenyl radicals and methyl radicals, the latter being in greater number than the phenyl radicals, which organo-polysiloxane boils at temperatures within a range of from 250° to 500° C., and is substantially free of material boiling at temperatures below said range.

6. Means for evacuating a closed system which comprises a condensation pump containing a liquid organo-polysiloxane having a composition corresponding substantially to the formula $(CH_3)_{10}(C_6H_5)_2Si_5O_4$ and having a boiling point of from 400° C. to 410° C. at atmospheric pressure.

7. Means for evacuating a closed system which comprises a condensation pump containing a liquid organo-polysiloxane having a composition corresponding substantially to the formula $(CH_3)_7(C_6H_5)_3Si_5O_5$ and having a boiling point of from 430° to 440° C. at atmospheric pressure.

8. Means for evacuating a closed system which comprises a condensation pump containing an organo-polysiloxane having a composition corresponding to the formula $(CH_3)_2(C_6H_5)_4Si_2O$.

9. In a method wherein a system is evacuated by means of a condensation pump, the step of entraining gas from the system in vapors of an organo-polysiloxane having the valences of the silicon atoms satisfied by siloxane linkages and by carbon atoms of hydrocarbon radicals, which organo-polysiloxane boils at temperatures within a range of from 250° to 500° C. and is substantially free of material boiling at temperatures below said range.

10. In a method wherein a system is evacuated by means of a condensation pump, the steps of entraining gas from the system in vapors of a heated organo-polysiloxane, having the valences of the silicon atoms satisfied by siloxane linkages and by carbon atoms of hydrocarbon radicals, which organo-polysiloxane boils at temperatures within a range of from 250° to 500° C. at atmospheric pressure and is substantially free of material boiling at temperatures below said range, and admitting oxygen into contact with the organo-polysiloxane while the latter is heated at a temperature above 150° C.

11. A method, as described in claim 10, wherein the organo-polysiloxane is composed of silicon, oxygen, phenyl radicals and methyl radicals.

12. A method, as described in claim 10, wherein the organo-polysiloxane is composed of silicon, oxygen, phenyl radicals and methyl radicals, the latter being in greater number than the phenyl radicals.

MELVIN J. HUNTER.

(References on following page)

REFERENCES CITED

The following references are of record in the file of this patent:

UNITED STATES PATENTS

| Number | Name | Date |
|---|---|---|
| 1,857,508 | Hickman | May 10, 1932 |
| 2,147,488 | Hickman et al. | Feb. 14, 1939 |
| 2,258,222 | Rochow | Oct. 7, 1941 |
| 2,265,962 | Bent | Dec. 9, 1941 |
| 2,371,050 | Hyde | Mar. 6, 1945 |
| 2,389,802 | McGregor | Nov. 27, 1945 |
| 2,398,187 | McGregor | Apr. 9, 1946 |
| 2,444,555 | Dandt | July 6, 1948 |
| 2,449,940 | Hyde | Sept. 21, 1948 |
| 2,457,677 | Hyde | Dec. 28, 1948 |
| 2,469,889 | Wilcox et al. | May 10, 1949 |

OTHER REFERENCES

Rochow, "Chemistry of the Silicones," p. 93 (1946), Wiley & Sons, publishers.